Sept. 14, 1937.　　　D. A. WALLACE　　　2,093,061
FURNACE
Filed Aug. 8, 1936
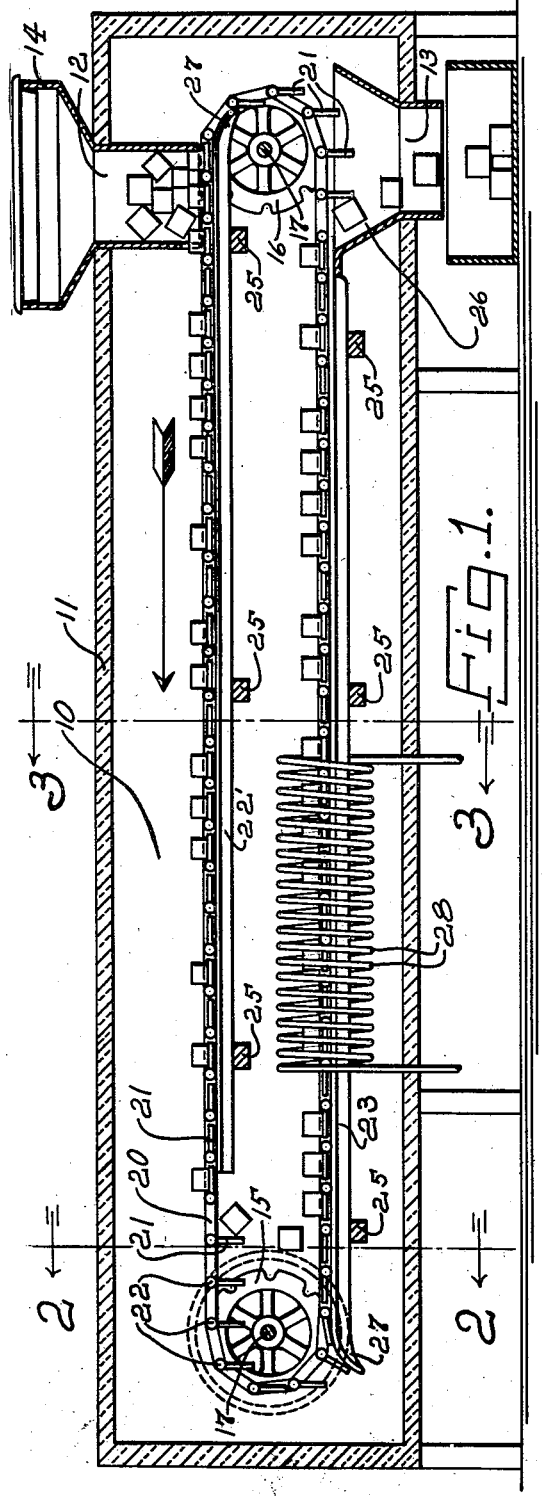
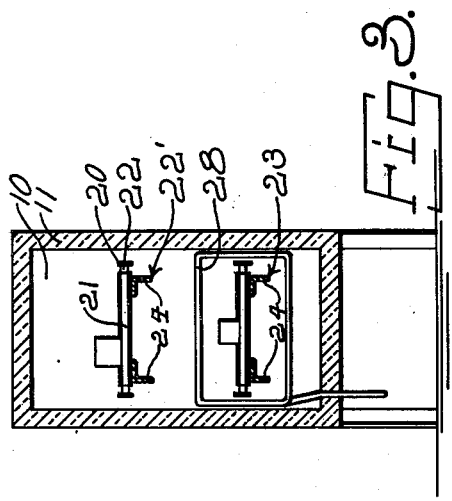
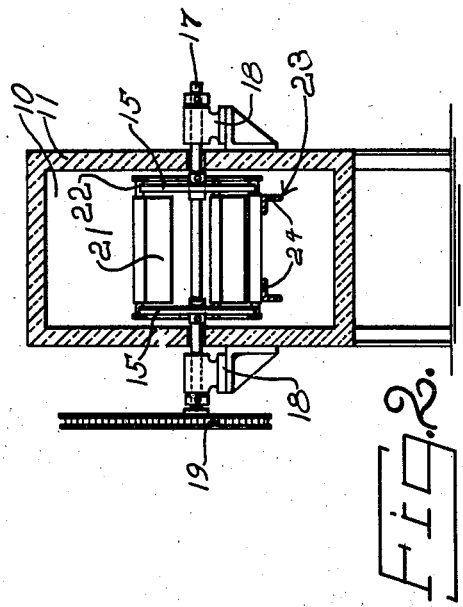
INVENTOR
DAVID A. WALLACE.
BY
Harness, Lind, Patee & Harris.
ATTORNEYS Patented Sept. 14, 1937

2,093,061

UNITED STATES PATENT OFFICE 2,093,061

FURNACE

David A. Wallace, Detroit, Mich., assignor to Chrysler Corporation, Highland Park, Mich., a corporation of Delaware Application August 8, 1936, Serial No. 94,893

3 Claims. (Cl. 263—8)

This invention relates to a furnace.

More particularly, the invention relates to a furnace especially adapted for annealing purposes although the invention in its broader aspects is not so limited.

An object of the invention is to provide a furnace wherein articles or material are initially preheated prior to application thereof to heating means by heat radiated from articles or material that have been subjected to the heating means. More particularly, the invention has for its object the utilization of waste heat radiated from articles after application to a heating element for preheating articles prior to application of latter to the heating element.

Another object of the invention is the provision in a furnace having a heating chamber and conveying means, heating apparatus so disposed with respect to the inlet and outlet openings of the heating chamber as to provide for a substantial distance of travel for articles after application to the heating apparatus and prior to discharge from the conveying means, to facilitate the transfer of heat from articles leaving the heating means to articles approaching the latter.

The above being among the objects of the present invention, the same consists in certain novel features of construction and combination of parts to be hereinafter described with reference to the accompanying drawing and claims, having the above and other objects in view.

The invention is illustrated and described in conjunction with a continuous automatic furnace having a heating chamber through which the articles to be operated on are moved by a conveyor having upper and lower sections. A heating element is disposed in a limited portion of the path of the conveyor and is so situated with respect to the heating chamber and the inlet and outlet openings of the latter that articles leaving the heating element are carried a substantial distance before reaching the discharge outlet in order that during this travel, the heat radiated from the articles may be supplied to the heating chamber adjacent the inlet opening for establishing a preheating zone. By this arrangement heat which would otherwise be wasted is applied to the incoming articles.

An illustration embodiment of the invention is shown in the accompanying drawing, in which:

Fig. 1 is a horizontal sectional view of a furnace embodying the invention.

Fig. 2 is a vertical sectional view taken on the line 2—2 of Fig. 1.

Fig. 3 is a vertical sectional view taken on the line 3—3 of Fig. 1.

Referring to the drawing, the furnace includes a casing or heating chamber 10 having an insulated wall structure 11 provided with inlet and outlet openings 12 and 13, respectively, for accommodating the passages of articles to be operated on. A loading hopper 14 is positioned in the inlet opening 12 and articles to be operated on are passed therethrough onto an endless conveyor extending longitudinally through the heating chamber 10 and running on pairs of sprocket wheels 15 and 16 positioned adjacent the respective ends of the chamber. The sprocket wheels are keyed on a respective shaft 17 extending transversely of the furnace and journalled in supporting brackets 18. Suitable driving means 19, as shown in Fig. 2, are provided for the conveyor.

The conveyor comprises a link chain structure 20 having a plurality of shelf-like platform carriers 21 pivotally attached thereto by means of cross pins 22 to alternate links of the chain. The carriers 21 are supported in a horizontal carrying position throughout the main course of their travel by upper and lower track sections 22 and 23, respectively, each of which includes a pair of substantially L-shaped rails or guide bars 24 supported on cross members 25. The rails 24 of the upper section 22 terminate in advance of the left end of the upper part of the conveyor, as viewed in Fig. 1, to permit turning of the carriers 21 to a vertical position to allow articles carried on the upper section 22 to fall and be deposited upon the lower section 23 in advance of the pair of sprocket wheels 15. The rails 24 of the lower section 23 likewise terminate in advance of the right end of the lower part of the conveyor to accommodate turning of the carriers 21 to vertical position and discharging of articles into a receiving hopper 26. The carriers 21 are returned to their horizontal carrying positions by engagement thereof with the downwardly inclined end portions 27 of the upper tracks adjacent the sprocket wheels 15 and 16, respectively.

The heating chamber 10 is provided with suitable heating means comprising an electric heating coil 28 disposed in a limited portion of the path of the conveyor on the lower track 23 and spaced from the inlet and outlet openings 12 and 13, respectively. The heating apparatus may comprise a resistance or inductance coil or any other suitable heating medium. In this manner a localized heating chamber is provided through which the articles are moved. While I have shown electrical heating means, it will be understood that the invention is not limited thereto inasmuch as the chamber may be heated by gas or in any other desired manner. After application of the articles to the heating means they are carried a substantial distance therebeyond prior to discharge into the receiving hopper 26 and during this period the heat radiated from the articles is supplied to the interior of the heating chamber 10 and more particularly to the right end portion thereof, as viewed in Fig. 1, through which incoming articles are carried by the upper section 23 of the conveyor. In this way the furnace is provided with a preheated zone through which incoming articles are passed, the zone being supplied with heat from articles leaving the heating chamber which would otherwise be wasted.

I do not limit my invention, in the broader aspects thereof, to any particular combination and arrangement of parts such as shown and described for illustrative purposes since various modifications will be apparent from the teachings of my invention and scope thereof as defined in the appended claims.

What I claim is:

1. In a furnace comprising a chamber having inlet and outlet openings for accommodating the passage of articles to be operated on, conveying means in said chamber comprising upper and lower sections, and a heating element in a limited portion of the path of said conveying means on said lower section and spaced from said openings so as to provide for a substantial distance of travel of articles after application to said heating element and prior to discharge from said conveying means to facilitate the transfer of heat from articles leaving said heating element to articles approaching the latter, the path of travel of articles immediately after application to said heating element and prior to discharge from said lower section being substantially parallel with the path of travel of incoming articles on the adjacent portion of said upper section.

2. In a furnace including a chamber having inlet and outlet openings for accommodating the passage of articles to be operated on, conveying means in said chamber comprising upper and lower sections, said sections each having an article receiving end and an article discharge end, heating means directly associated with only said lower section and having inlet and outlet ends directed towards the receiving and discharge ends of said lower section respectively, the portion of said lower section between said heating means outlet and the discharge end of said lower section being directly below the path of travel of articles on the receiving end portion of said upper section for subjecting said incoming articles directly to heat emitted from the heated articles immediately upon passage of the latter from the outlet end of said heating means.

3. In a furnace including a chamber having adjacent inlet and outlet openings for accommodating the passage of articles to be operated on, continuous conveying means in said chamber comprising upper and lower sections disposed adjacent said openings respectively, and a heating element directly associated with said lower section, said element being disposed intermediate the ends of said lower section and spaced from said chamber outlet opening, the portion of said lower section between the article discharge end of said heating element and said chamber outlet opening providing a substantial distance of travel for heated articles in a path directly below incoming articles on the adjacent portion of said upper section for subjecting said incoming articles directly to heat emitted from said heated articles immediately upon discharge of the latter from said heating element.

DAVID A. WALLACE.